US008736225B2

(12) United States Patent
Chen et al.

(10) Patent No.: US 8,736,225 B2
(45) Date of Patent: May 27, 2014

(54) MODULARIZED INTERFACE AND RELATED METHOD FOR CONNECTING PLUG-IN ELECTRIC VEHICLES TO THE ENERGY GRID

(75) Inventors: Chris W. Chen, Carlsbad, CA (US); Robert Peelle, Carlsbad, CA (US); Viral Bhalodia, Anaheim Hills, CA (US); Ken Yu, San Jose, CA (US); Gabriel Gavrielides, San Mateo, CA (US); Terry Mohn, San Diego, CA (US); John C. Martin, San Diego, CA (US)

(73) Assignee: San Diego Gas & Electronic Company, San Diego, CA (US)

( * ) Notice: Subject to any disclaimer, the term of this patent is extended or adjusted under 35 U.S.C. 154(b) by 1521 days.

(21) Appl. No.: 12/265,678

(22) Filed: Nov. 5, 2008

(65) Prior Publication Data

US 2010/0045232 A1    Feb. 25, 2010

Related U.S. Application Data (60) Provisional application No. 61/090,492, filed on Aug. 20, 2008.

(51) Int. Cl.
*H02J 7/14* (2006.01)
(52) U.S. Cl.
USPC .......................................... 320/104; 320/109
(58) Field of Classification Search
USPC ........................................................ 320/104
See application file for complete search history.

(56) References Cited

U.S. PATENT DOCUMENTS

| | | | |
|---|---|---|---|
| 5,934,918 A * | 8/1999 | Wuechner | 439/133 |
| 6,930,410 B2 * | 8/2005 | Ikeda et al. | 307/140 |
| 2003/0120442 A1 * | 6/2003 | Pellegrino et al. | 702/60 |
| 2008/0039979 A1 | 2/2008 | Bridges et al. | |
| 2008/0039980 A1 | 2/2008 | Pollack et al. | |
| 2008/0039989 A1 | 2/2008 | Pollack et al. | |
| 2008/0040223 A1 | 2/2008 | Bridges et al. | |
| 2008/0040263 A1 | 2/2008 | Pollack et al. | |
| 2008/0040295 A1 | 2/2008 | Kaplan et al. | |
| 2008/0040296 A1 | 2/2008 | Bridges et al. | |
| 2008/0040479 A1 | 2/2008 | Bridge et al. | |
| 2008/0052145 A1 | 2/2008 | Kaplan et al. | |

(Continued)

OTHER PUBLICATIONS

Welcome to Plug Smart; www.plugsmart.net, pp. 1-2, 2008.

(Continued)

*Primary Examiner* — Edward Tso
*Assistant Examiner* — Johali Torres Ruiz
(74) *Attorney, Agent, or Firm* — Klein, O'Neill & Singh, LLP (57) ABSTRACT

This invention is directed to a modularized interface for connecting a plug-in electric vehicle to the energy grid. For use with public or semi-public outlets, the modularized interface comprises a module and a smart socket, where the module is integrated within or capable of being connected to, the vehicle's charging interface. The module is normally disabled, but is enabled only after the end user is authenticated, the smart socket and its associated meter have been identified, and the module and the end user's account with the local utility are validated. The module meters the energy consumption, and, when the module is disconnected from the smart socket, indicating termination of the charging session, the metered data is communicated to the utility for updating the end user's account, and the module is disabled. The module is also capable of use with conventional outlets located, for example, in private residences.

29 Claims, 7 Drawing Sheets

(56) References Cited

U.S. PATENT DOCUMENTS

| | | |
|---|---|---|
| 2008/0249965 A1 | 10/2008 | Pollack et al. |
| 2009/0043450 A1* | 2/2009 | Tonegawa et al. ............... 701/36 |
| 2009/0045676 A1* | 2/2009 | Rosendahl ....................... 307/31 |
| 2009/0082916 A1* | 3/2009 | Tanaka ............................ 701/22 |
| 2009/0174365 A1 | 7/2009 | Lowenthal et al. |
| 2009/0192927 A1* | 7/2009 | Berg et al. ....................... 705/34 |

OTHER PUBLICATIONS

Plug Smart Home Demonstration Kit and products; www.plugsmart.net, pp. 102; 2008.

Plug Smart; How Will Electric Vehicles Impact the Industry?, www.plugsmart.net; Oct. 22, 2008.

\* cited by examiner

MODULARIZED INTERFACE AND RELATED METHOD FOR CONNECTING PLUG-IN ELECTRIC VEHICLES TO THE ENERGY GRID

This application claims the benefit of U.S. Provisional Application No. 61/090,492, filed Aug. 20, 2008.

TECHNICAL FIELD

This invention relates to a modularized interface and related method for connecting a plug-in vehicle (i.e., hybrid or all-electric) to the energy grid in a flexible, secure and controlled manner.

BACKGROUND OF THE INVENTION

Plug-in vehicles (both hybrid and all electric) need to interface with the electricity grid so that vehicle owners will have safe, secure and convenient access to electricity. Utility companies also need this interface so they can properly manage the electricity demands of these vehicles and properly bill electricity used by these vehicles to their owners.

Such an interface should be flexible, so that it can be used with public, as well as semi-public, vehicle outlets. Public electric vehicle outlets are expected to be made available by local governments, and property and business owners. Availability of outlets may be driven by public policy or the desire to encourage electric vehicle owners to work for or do business with a particular business. For example, shopping malls may install outlets to make their stores a more attractive place at which to shop. Similarly, owners of electric vehicles who reside in multi-family units may not have private access to electrical outlets to charge their vehicles. Such owners may have no choice but to use public or semi-public outlets, for example, within a bank of outlets installed in apartment/condominium parking areas with energy charges billed to the car owner.

Moreover, while owners of private vehicles that own private residences may not need a special interface to charge their cars at their own homes, they may be given incentives to use such interfaces by the local utility offering special, reduced electric vehicle charging rates. Utilities will likely offer these rates during off-peak electricity demand periods. Thus, the interface should be capable of being used with private outlets as well.

Another key issue is security. Any interface should ensure that use with publicly available electric vehicle outlets does not expose outlet owners to energy theft.

A third key issue is controlling the use of the interface with respect to public outlets so that the energy user can be identified and billed for the electricity costs.

A fourth key issue is allowing utility control of vehicle charging behavior. This interface will identify vehicles charging from the grid to the local utility and allow the utility to enable/disable charging based on electricity demands and grid conditions.

SUMMARY OF THE INVENTION

The present invention is directed to a modularized interface that allows plug-in electric (hybrid or all electric) vehicles to connect to the electrical grid in a manner which allows vehicle owners to control and be accountable for their use of electricity and utilities to manage and measure electricity loads from electric vehicles.

The modularized interface comprises a module, that may either be a stand-alone portable module that plugs into the vehicle's charging interface (i.e., off-vehicle solution), or a module that is pre-integrated into the vehicle's charging interface (i.e., on-vehicle solution). In one embodiment, the modularized interface also comprises a smart socket (i.e., a socket configured with local intelligence such as a microcontroller) through which the module will connect to the electric grid in public and semi-public areas. The module may be used independently of the smart socket when connecting to the electric grid through conventional sockets in private areas.

The module comprises a communications interface for allowing communication, wired or wireless, between the module and the local utility. In one embodiment, the communications interface is a communications chip configured to allow communications with an access point (i.e., meter) of the local electric utility's Advanced Metering Infrastructure (AMI) Home Area Network (HAN). In this embodiment, the access point may be a wireless chip attached to a meter that can wirelessly communicate with the module. In other embodiments, the communications interface may be separate from the home area network and may be dedicated to communication with the utility, or it may share a communications interface for communication with the utility.

The module also comprises a security authentication device for authenticating the module owner (energy user) at each use, such as through the user typing in a password or satisfying a biometric scan. When authentication is successful, the module is enabled, but otherwise remains disabled.

The module is capable of two modes of operation, with the first mode comprising use with a smart socket that forms a public or semi-public connection to the energy grid, and the second mode comprising use with a conventional socket in a private residence. In the first mode of operation, once enabled, the module will communicate a unique access code to the local utility via the communication interface. The local utility will validate the code, which may be tied to the module owner's utility account or other billing mechanism. Once validated, the utility will signal the public socket to enable energy to flow to the module.

In one embodiment, the module periodically receives pricing information from the utility. This pricing information may be used by the module to determine the cost, credits, or discounts to the user for charging or discharging. The pricing information may be used by the module to determine when to charge or discharge. The total cost, credits, or discount from a charging or discharging event may be calculated by the utility based on charging or discharging time and total energy charged or discharged.

The module may be pre-programmed with the user's local electric utility account information or other billing information. It may also be pre-programmed with user preferences regarding desired energy pricing or charging times. For example, such user preferences may indicate the user does not wish to pay more than a predetermined rate, e.g., 10 cents per kilowatt hour, or that the user only wishes charging to occur between certain off-peak hours, for example, between 11 PM and 7 AM, to take advantage of off-peak pricing. Other user preferences may allow discounts or credits for electricity use if the user authorizes the utility to discharge the vehicle during times of peak electricity usage, thus providing a source of electricity to the grid. In this embodiment, users may receive charging discounts or credits by charging during off-peak hours, and discharging into the grid during peak hours. In a related embodiment, the module may allow the utility to cut energy flow to the vehicle during power emergencies such as too much electricity demand.

Such information may be pre-programmed in the module through the communication interface or via a separate USB port on the module. Once pre-programmed, in one embodiment, the module may also be re-programmed but only by the local utility and then only after verification of the identity of the owner is performed. In other embodiments, the user may override pre-programmed settings.

The module will only allow the energy to flow if pre-programmed user preferences, if any, are satisfied. Thus, if the user indicates a preference to pay no more than 10 cents per kilowatt hour, or for energy charging to occur only during off-peak hours, the module will not allow the energy to flow until these conditions are satisfied.

Once the module is enabled, the user's access code and/or account information is transmitted via the communication interface to the local utility. The electricity which passes through the module, either to or from the vehicle, is metered by the module. Upon the module being disconnected from the smart socket, the metered data, including both time of use and consumption, is transmitted via the communications interface to the local utility so that it can be billed to the energy user's local utility account or other billing account. The utility meter through which the energy is drawn is then credited with an offsetting amount.

Once the flow of energy is broken (the module is unplugged from the smart socket), the socket and module are both automatically disabled. This automatic disabling will disable theft of electricity and deter theft of the modules since they will not be usable by anyone other than the module owner. An optional anti-theft feature is to enable the module to physically lock on to the plug from the vehicle so it can only be removed with a key or user validation (password or other secure technique, such as biometric scan).

In the second mode of operation, the module communicates with the local utility through the vehicle owner's HAN or other communications vehicle, and identifies the charging device as a plug-in vehicle that is eligible for electric vehicle rates. The module will confirm the identity of the vehicle as a plug-in vehicle as obtained from the vehicle's built-in VIN chip or through the high amperage required for vehicle charging.

As in the first mode of operation, the module may also be pre-programmed with user preferences regarding energy pricing or charging time periods, and the energy flow will only commence once these pre-programmed conditions, if any, are satisfied.

Some embodiments of the invention include systems to prevent device theft and unauthorized disconnection during charging. These embodiments may include secure connections between the module and the vehicle and between the module and the outlet connection to the energy grid. The secure connection between the module and the outlet may include prongs with retractable barbs, which extend upon insertion into slots to prevent the socket from disconnecting from the module during charging. The secure connection may also include a tether cable with a securing bracket for preventing the vehicle plug from being disconnected from the module during charging. The tether cable may include a securing bracket with non-standard screw heads or other locking mechanism to prevent unintentional or unauthorized removal of the vehicle plug from the module.

DETAILED DESCRIPTION OF THE INVENTION

Figure 1:
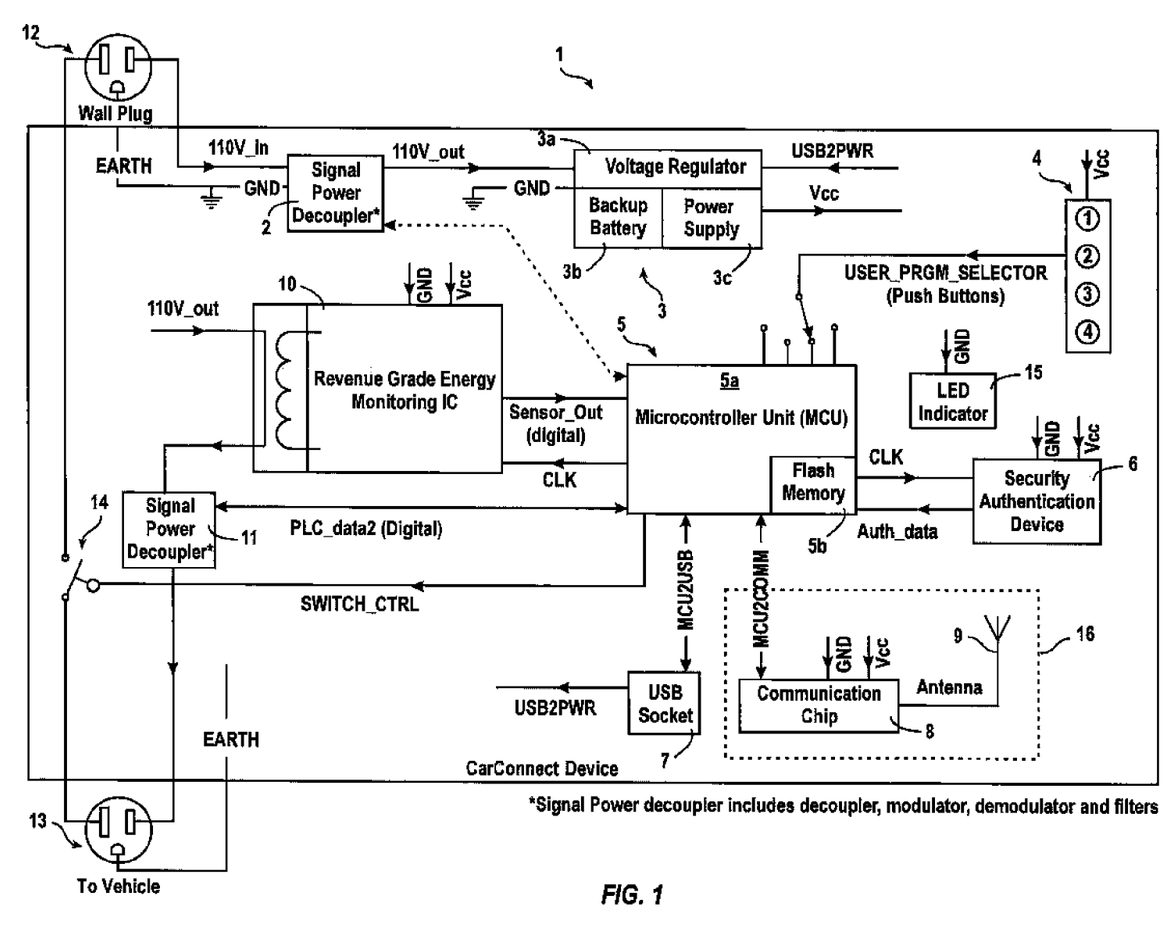
FIG. 1 is a schematic of one embodiment of the module according to the invention, where operation of the module is controlled by a microcontroller with embedded flash memory.

Referring to FIG. 1, module 1 forms a connection between the vehicle's charging interface and an outlet that connects to the energy grid. In one implementation, as shown, a male plug from the vehicle's charging interface plugs into a corresponding female socket 13 on the module, and a male plug 12 on the module plugs into a corresponding female socket connected to the energy grid.

Microcontroller unit (MCU) 5, comprising processor core 5a, embedded flash memory 5b, analog to digital converter (ADC) (not shown), and several programmable input/output peripherals (not shown), controls module operation. In one embodiment, it also synchronizes the data retrieved from the energy sensor 10 (to be described later) prior to transmitting it to the local utility via the communications interface or BPL. A software flowchart depicting the operation of MCU 5 will be presented later.

The flash memory 5b is non-volatile memory that stores certain pre-programmed information, such as the user's utility account information and access code, and also user preferences regarding energy pricing and desired charging times. This information may be pre-programmed into the flash memory 5b through a number of suitable means, including the Internet, a USB port (e.g., USB socket 7), the communications interface 16, which is described later, or BPL.

Communications interface 16, comprising communication chip 8 and antenna 8, is configured, in one embodiment, to wirelessly communicate data from the MCU 5 to the local utility via the access point (i.e., meter) in the outlet owner's HAN using a suitable protocol, including but not limited to WiFi (802.15), ZigBee (802.15.4), WiMAX (8-2.16), satellite, and RF. In another embodiment, the communications interface 16 is configured to communicate data from the MCU 5 to the local utility via a wired link. The connection formed by communications interface may either be downlink only (i.e., from the module to the utility) or bi-directional.

LED indicator 15 is configured to provide a visual indication when the module is waiting for the end user to authenticate himself/herself.

Security authentication device 6 is any suitable device for authenticating the identity of the end user. Options include a fingerprint reader, a password keypad, etc.

User program selector 4 allows a user to set or change charging preferences (charge immediately, charge at certain time of day, respond to price signals, etc).

Energy sensor 10 is an IC that senses bi-directional energy flow through the module 1 and outputs a digital signal indicative of a characteristic of the energy flow, e.g., amperage. This information is periodically transmitted to the MCU 5, which may in turn communicate the information to the local utility via communications interface 16.

Signal power decoupler 2 separates the mixed power signal from plug 12, which may either be inserted into a smart socket or a conventional socket, into a 110 V (60 Hz) AC power signal and data, if any, that was previously modulated onto the power signal and communicated via BPL (Broadband-Over-Power Line). As will be discussed, in the case where the plug 12 is connected to a smart socket, data communicated to the module 1 via BPL comprises an identifier of the socket and its associated meter.

Signal power decoupler 11 combines the 10V, 60 Hz power signal with data, if any, to form a mixed signal that is communicated to the vehicle via the vehicle charging interface socket 13.

The voltage regulator 3 regulates the DC voltage of power supply 3c to maintain it at constant voltage level, Vcc. The backup battery 3b powers the module 1 before energy flow from the energy grid is enabled.

Switch 14 is normally open, but is closed only after the end user has been authenticated and the module has been enabled.

Figure 2:
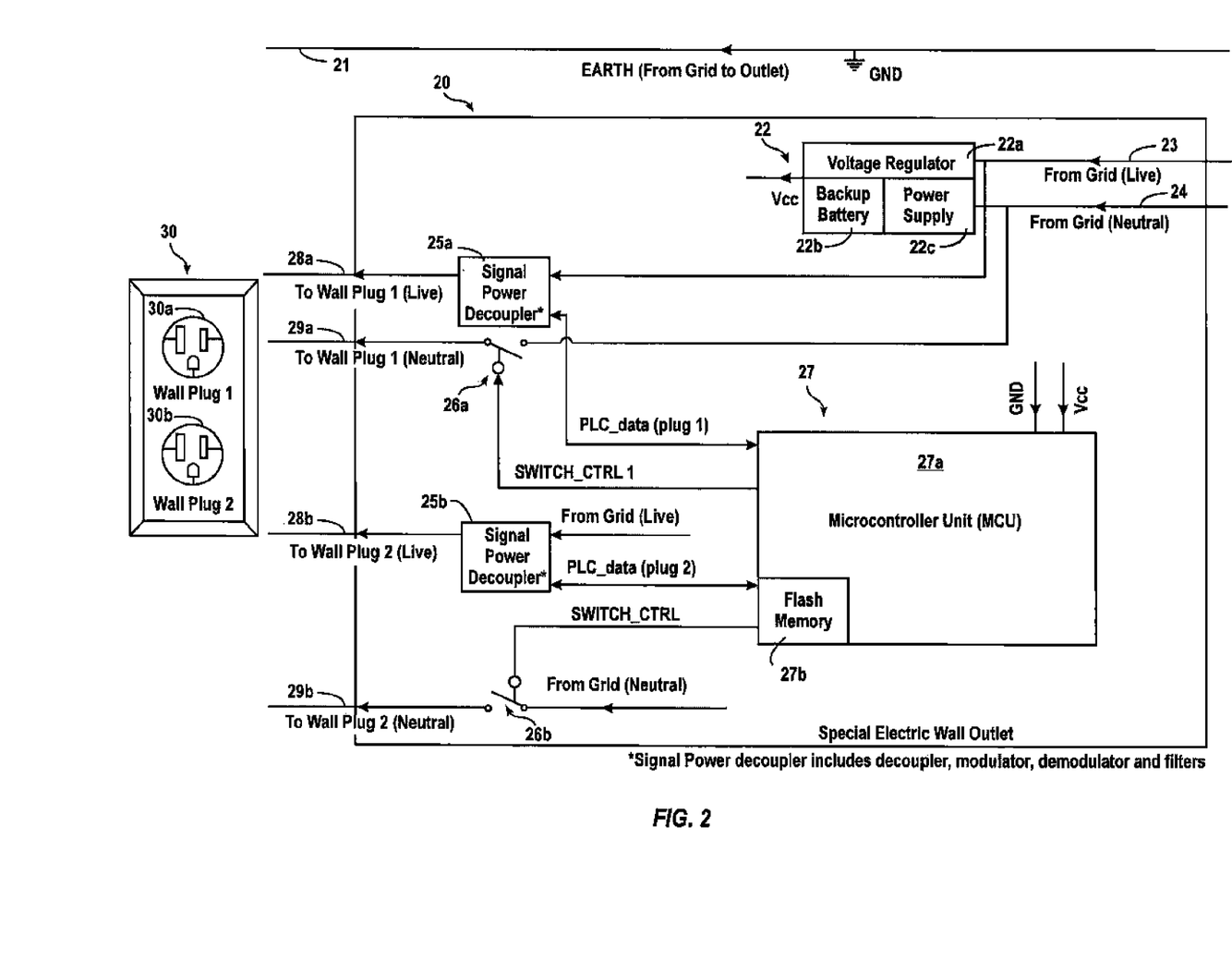
FIG. 2 is a schematic of one embodiment of a smart socket according to the invention where operation of the smart socket is controller by a microcontroller with embedded flash memory.

FIG. 2 is a schematic of smart socket 20, which embodies or functions as a public or semi-public outlet. It is used to connect the module 1 to the energy grid in the first mode of operation.

As shown, in one implementation, socket 20 comprises one or more female outlets 30a, 30b, each corresponding to male plug 12 from the module of FIG. 1. Each of the outlets 30a, 30b is indirectly connected to the energy grid through earth (line 21), grid live (line 23) and grid neutral (line 24) lines.

Microcontroller unit (MCU) 27, comprising processor core 27a, embedded flash memory 27b, analog to digital converter (ADC) (not shown), and several programmable input/output peripherals (not shown), controls socket operation. More specifically, MCU 27 is responsible for controlling the functionality of the socket 20 when a module is connected to it, including communicating meter and socket identification information to the module via BPL. It also controls a relay (switches 26a, 26b), which, when closed, allows electricity to flow to the module.

The voltage regulator 22 regulates the DC voltage of power supply 22c to maintain it at constant voltage level, Vcc. The backup battery 22b powers the socket 20 before energy flow from the energy grid is enabled.

Signal power decoupler 25a combines the 110V, 60 Hz grid live power signal from line 23 with data, if any, from MCU 27 to form a mixed signal that is communicated to the module 1 over line 28a.

Signal power decoupler 25b combines the 110V, 60 Hz grid neutral power signal from line 24 with data, if any, from MCU 27 to form a mixed signal that is communicated to the module 1 via line 29a.

Figure 3:
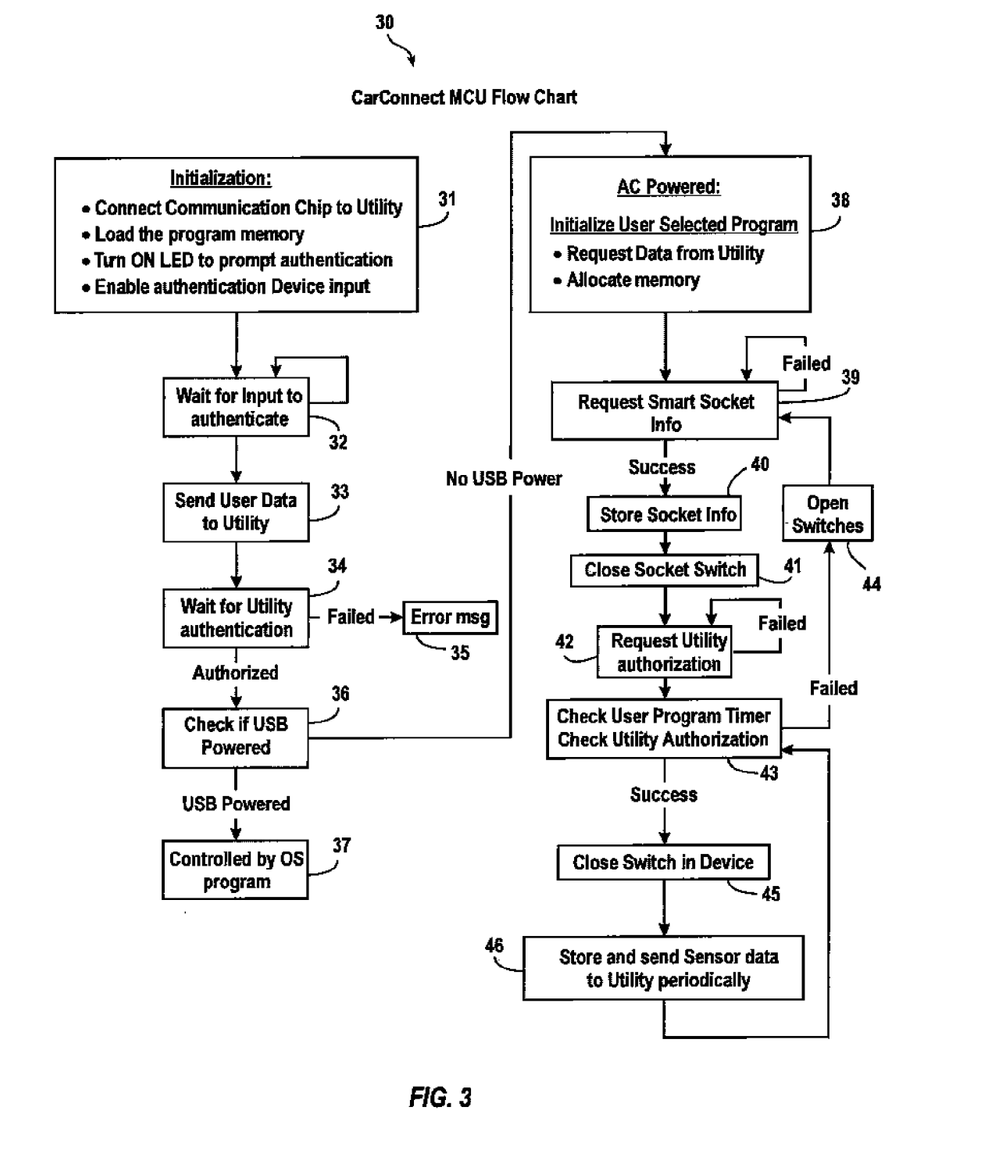
FIG. 3 is a flowchart of one embodiment of a software flow chart for the microcontroller in the module of FIG. 1.

FIG. 3 is an embodiment of a software flow chart 30 depicting the operation of MCU 5 in FIG. 1. As will be appreciated, this flow chart represents software, embodying a method of operation, that is stored in a medium that is readable by MCU 5, including flash memory 5b, but also volatile memory, such as RAM, that may be loaded from the flash memory 5b upon power-up.

This flowchart depicts the first mode of operation, when the connection to the energy grid occurs by connecting the module to a public or semi-public outlet.

In block 31, the MCU 5 guides the module 1 through initialization, which includes establishing a connection to the local utility through the communications interface 16, loading the program memory (i.e., RAM), with the MCU software, turning on the LED 15 to prompt the end user to authenticate himself/herself, and enabling the security authentication device 6 to receive input. In one embodiment, as discussed, the connection is a wireless connection that is established with an access point (i.e., the meter for the outlet) in the outlet owner's HAN.

From block 31, the process proceeds to block 32. In block 32, the process loops, waiting for the end user to authenticate himself/herself via security authentication device 6 using a password, fingerprint, or other secure technique such as a biometric scan. Upon the user doing so, the process proceeds to block 33.

In block 33, the module, via the communications interface 16, transmits user data (e.g., a unique access code associated with the user's account), that was pre-programmed and stored in the flash memory 5b, to the local utility via the communications interface (e.g., the HAN for the owner of the public or semi-public outlet). The process then proceeds to block 34. where the process waits for the utility to authenticate the user code. If the utility fails to authenticate the code, or affirmatively indicates that the code failed, i.e., by communicating a "failed" message via BPL to the module, the process outputs an error message, represented by block 35.

However, if the utility authenticates the code, it communicates an "authorized" message to the module via BPL, and then jumps to block 36.

In block 36, the process checks to see if the module is being powered through the USB port 7, indicating that a host processor is coupled to the module. If so, as indicated in block 37, the host operating system is given control of the module.

If, on the other hand, the module is intended to be AC-powered, the process jumps to block 38. In block 38, pre-programmed information, if any, reflecting user preferences is retrieved and stored in memory, and data needed to implement those preferences, i.e., pricing, is requested from the utility, either via the communications interface 16 (if the connection is bi-directional) or BPL (if the connection via communications interface 16 is downlink-only). From block 38, the process proceeds to block 39.

In block 39, the module requests, via BPL, that the smart socket inform it of its identity and that of its related meter. If the request yields the desired information, the process then jumps to block 40.

In block 40, the process stores this information within the module (i.e., within the flash memory 5b). The process then jumps to block 41.

In block 41, the module requests, via BPL, that MCU 27 close switches 26a and 26b, thus enabling the smart socket, which the MCU does. (At this point, switch 14 within the module is still open, thus preventing energy flow). The process then jumps to block 42.

In block 42, the module again requests utility authorization, and loops until the necessary authorization is received. Once the authorization is received, the process proceeds to block 43.

In block 43, the process checks whether the conditions implied by the pre-programmed user preferences, if any, have been satisfied. If so, the process jumps to block 45.

In block 45, MCU 5 is directed to close the switch 14 within the module, thus enabling power to flow. The process then proceeds to block 46.

In block 46, the module periodically senses data regarding energy flow through the module (via energy sensor 10), and transmits the same to the local utility via the communications interface 16 or BPL. The process then jumps back to block 43, whereupon it loops indefinitely through blocks 43, 45, 46 until the user disconnects the vehicle and/or the module from the connection to the electric power grid. The steps taken when the user disconnects the vehicle and/or the module from the connection will be discussed in relation to FIGS. 5-6.

Figure 4:
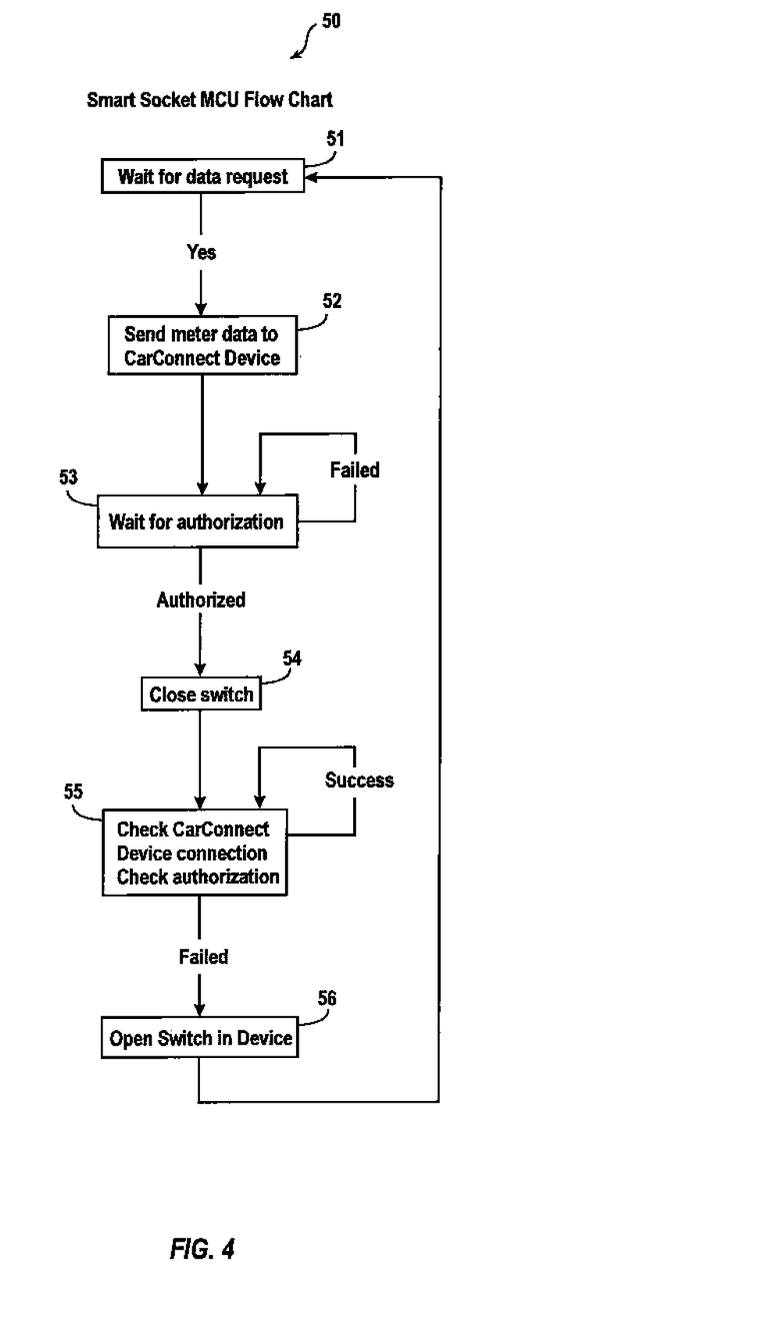
FIG. 4 is a flowchart of one embodiment of a software flow chart for the microcontroller in the smart socket of FIG. 2.

FIG. 4 is an embodiment of a software flow chart 50 for MCU 27 in FIG. 2. As will be appreciated, this flow chart represents software, embodying a method of operation, that is stored in a medium that is readable by MCU 27, including flash memory 27*b*, but also volatile memory, such as RAM, that is loaded from the flash memory 5*b* upon power-up.

In block 51, the smart socket waits for a request from the module for the identity of the socket and its associated meter. When such a request is received, the process proceeds to block 52.

In block 52, the MCU 27 retrieves this information from flash memory 27*b*, and communicates it to the module via BPL. From block 52, the process proceeds to block 53.

In block 53, the socket waits for an indication of utility authorization from the module. If such indication is obtained via BPL, the process proceeds to close switches 25*a*, 25*b* as depicted in block 54. The process then proceeds to block 55.

In block 55, the socket periodically checks the status of the connection and the utility authorization. If the connection and the utility authorization are both intact, the process loops. If either the connection or the utility authorization is no longer intact, the process proceeds to block 56.

In block 56, the process opens switches 25*a*, 25*b*, thus disabling the socket.

From block 56, the process jumps back to block 51, where it waits for another request for socket and meter identity.

Figure 5:
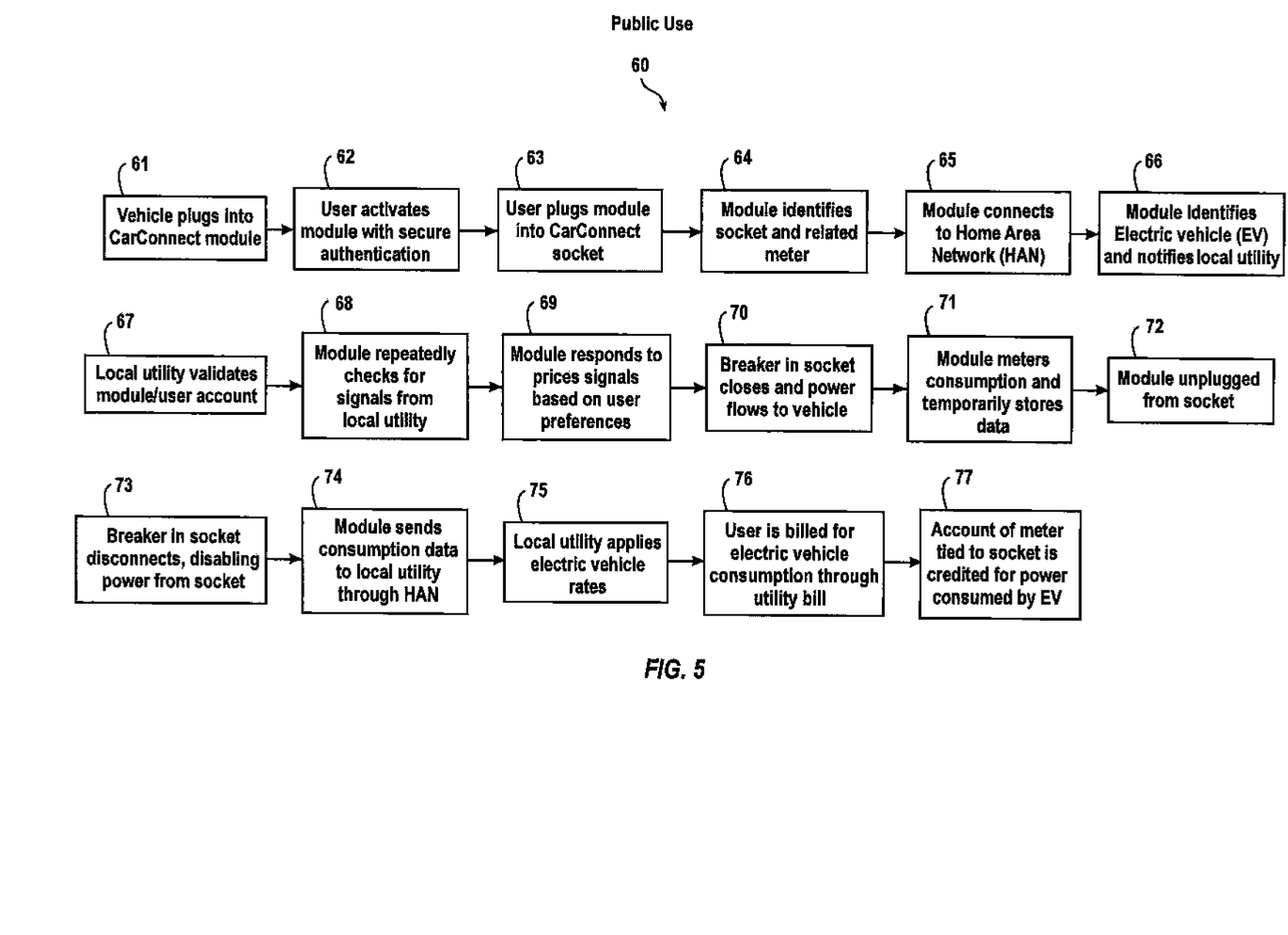
FIG. 5 is a timing diagram showing the key events in connecting the module of FIG. 1 between a plug-in vehicle and the smart socket of FIG. 2, which forms a public or semi-public outlet.

FIG. 5 is a timing diagram illustrating the timing of the key events in the overall process of connecting a plug-in vehicle to the energy grid through a public or semi-public outlet. As will be seen, some of these events are manual steps performed by the end user, and some are performed by the MCU's 5, 27 operating pursuant to the flow charts of FIGS. 3-4.

In block 61, the user inserts the male plug from the vehicle's charging interface into the corresponding female socket on the module.

Then, in block 62, the user activates the module after successfully authenticating himself/herself via security authentication device 6.

In block 63, the user inserts the male plug from the module into the corresponding female socket of the public or semi-public outlet.

In block 64, the module identifies the socket and the related meter. As previously explained, the module obtains this information from the socket via BPL, with FIG. 4 depicting the process steps undertaken by MCU 27 in providing this information.

In block 65, the module connects to the local utility via the communications interface 16. In one embodiment, as previously explained, the module connects via the access point (i.e., meter) for the outlet in the utility's Home Area Network (HAN).

In block 66, the module identifies the vehicle as a plug-in vehicle and notifies the local utility of this identity through the connection established in block 65. This information is needed for the purpose of obtaining advantageous energy pricing from the utility.

In block 67, the local utility validates the module and the user account. As previously explained, this is accomplished by sending the local utility a unique access code for the user over the connection established in block 65. Using this information, the utility validates the module and the user's account, and transmits the results of this validation (i.e., successful or not) back to the module via BPL or the connection established via communications interface 16.

Assuming the validation is successful, block 68 is performed. In block 68, the module repeatedly checks for price signals from the local utility. The utility communicates this information to the module over the connection established in block 65, assuming that connection is bi-directional, or via BPL.

Block 69 follows block 68. In block 69, the module responds to the price signals based on user preferences. For example, if the user has expressed a preference that charging not occur until the price of energy is at or below 10 cents per kilowatt hour, the module iterates until the price as reported from the utility meets this condition. At that point, the process proceeds to block 70.

In block 70, the module directs the socket to close the socket switches (26*a*, 26*b*). In addition, if not already accomplished, the module closes the module switch 14, allowing power to flow to the vehicle.

In block 71, the module meters the consumption of energy and stores this information.

In block 72, the end user unplugs the module from the socket when the charging session is over or the user wishes to terminate the charging session.

In block 73, a breaker in the socket disconnects, opening switches 26*a*, 26*b*, thus disabling the socket.

In block 74, the module sends the consumption data to the local utility through the connection established in block 65.

In block 75, the local utility calculates the amount owed for the energy consumption, using the preferred rates for electric vehicles.

In block 76, the local utility charges the user's account with the amount calculated in block 75.

In block 77, the meter tied to the socket is credited with the amount calculated in block 75. Then, the switch 14 in the module is opened, disabling the module.

Figure 6:
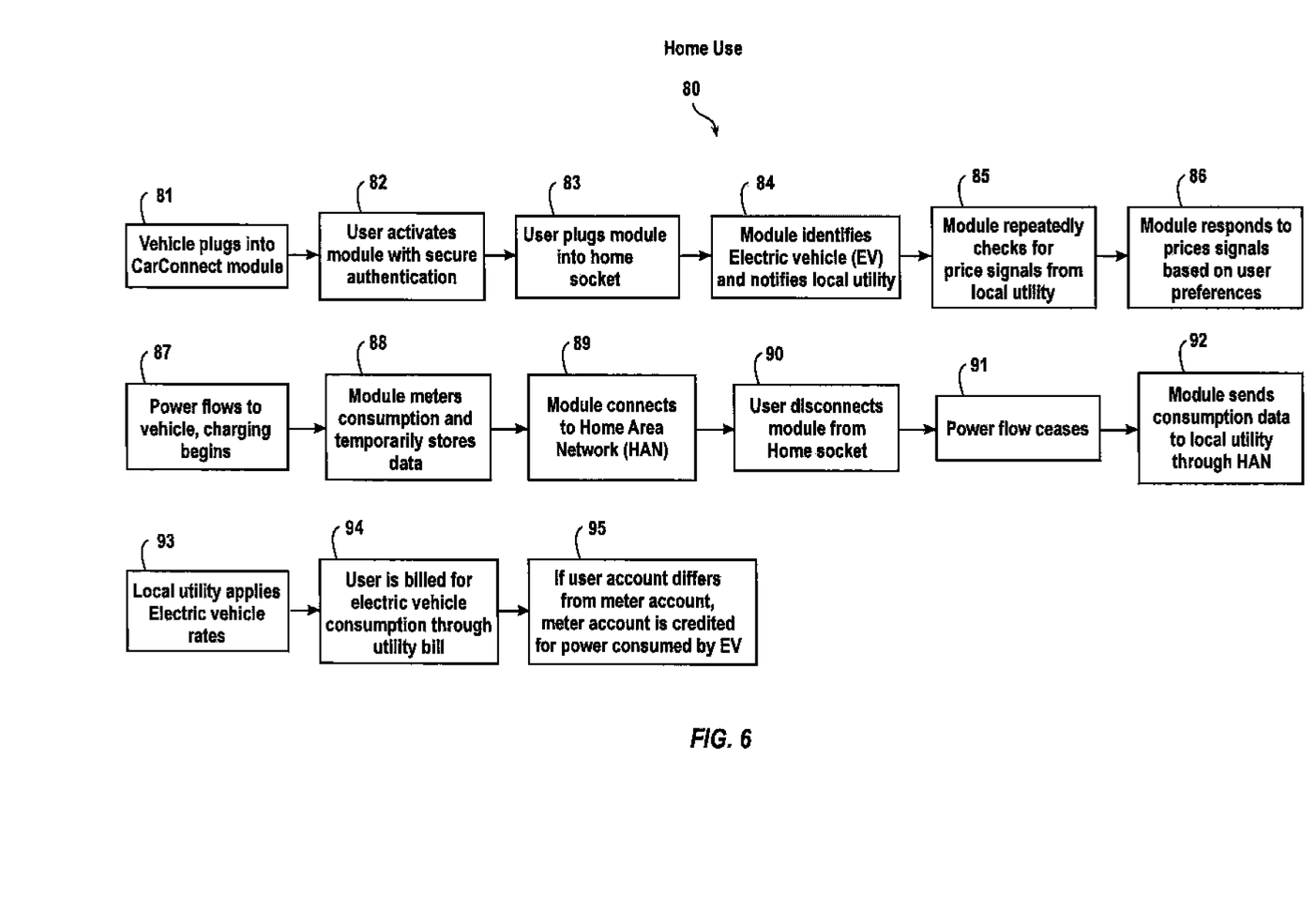
FIG. 6 is a timing diagram showing the key events in connecting the module of FIG. 1 between a plug-in vehicle and a conventional socket, which forms a private outlet.

FIG. 6 is a timing diagram illustrating the timing of the key events in the overall process of connecting a plug-in vehicle to the energy grid through a private (i.e., home) outlet. As will be seen, some of these events are manual steps performed by the end user, and some are performed by the MCU's 5, 27 operating pursuant to the flow charts of FIGS. 3-4.

In block 81, the user inserts the male plug from the vehicle's charging interface into the corresponding female socket on the module.

Then, in block 82, the user activates the module after successfully authenticating himself/herself via security authentication device 6.

In block 83, the user inserts the male plug from the module into the corresponding female socket of the home outlet.

In block 84, the module identifies the vehicle as a plug-in vehicle and notifies the local utility of this identity. In one implementation, this is accomplished via BPL. This information is needed for the purpose of obtaining advantageous energy pricing from the utility.

In block 85, the module repeatedly checks for price signals from the local utility. In one implementation, the utility communicates this information to the module via BPL.

Block 86 follows block 85. In block 86, the module responds to the price signals based on user preferences. For example, if the user has expressed a preference that charging not occur until the price of energy is at or below 10 cents per kilowatt hour, the module iterates until the price as reported from the utility meets this condition. At that point, the process proceeds to block 87.

In block 87, the module directs the socket to close the socket switches (26a, 26b). In addition, if not already accomplished, the module closes the module switch 14, allowing power to flow to the vehicle.

In block 88, the module meters the consumption of energy and stores this information.

In block 89, the module connects to the local utility via the communications interface 16. In one embodiment, as previously explained, the module connects via the access point (i.e., meter) for the user's outlet in the utility's Home Area Network (HAN).

In block 90, the user unplugs the module from the socket when the charging session is over or the user wishes to terminate the charging session. In response, a breaker in the socket disconnects, opening switches 26a, 26b, and disabling the socket.

In block 91, energy flow to the vehicle ceases.

In block 92, the module sends the consumption data to the local utility through the connection established in block 89.

In block 93, the local utility calculates the amount owed for the energy consumption, using the preferred rates for electric vehicles.

In block 94, the local utility charges the user's account with the amount calculated in block 93.

In block 95, if the user account differs from the meter account for the meter tied to the user outlet, the meter account is credited with the amount calculated in block 93. Then, the switch 14 in the module is opened, disabling the module.

As can be seen from the foregoing, the main differences between the overall processes depicted in FIGS. 5-6 is that block 64 and 67 in the process depicted in FIG. 5 (public use) are eliminated from the process depicted in FIG. 6 (home use). These steps, where the module identifies the public or semi-public socket and related meter (block 64), and the local utility validates the module and the user account (block 67), are unnecessary in the process depicted in FIG. 6, where the user connects the module to a private outlet or socket in the user's own residence.

Figure 7A:
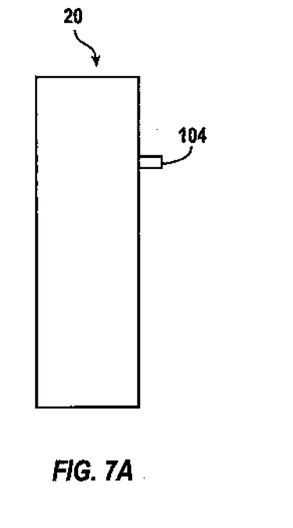
FIG. 7A is a side view of an embodiment of the smart socket with prongs for preventing unauthorized disconnection from the module.
Figure 7B:
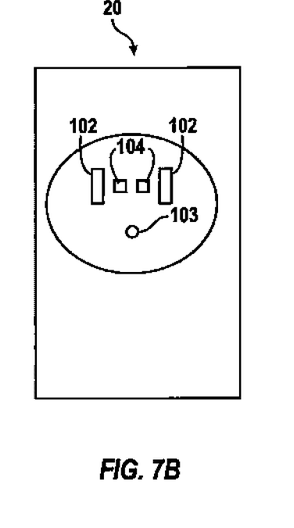
FIG. 7B is a front view of an embodiment of the smart socket with prongs for preventing unauthorized disconnection from the module.
Figure 7C:
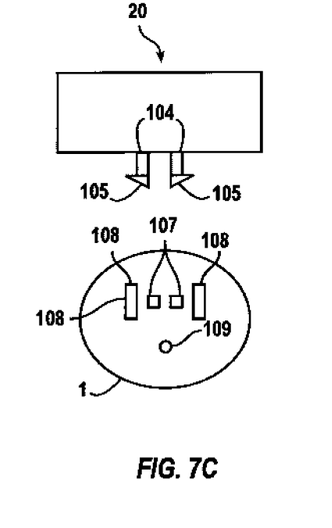
FIG. 7C is a top view of an embodiment of the smart socket with prongs for preventing unauthorized disconnection from the module and showing how the smart socket connects to the module.

Preferably, the smart socket and module of the invention includes mechanisms for preventing unauthorized removal of the module from the smart socket during charging in order to prevent malicious or accidental tampering, unauthorized use of the module, or energy theft. Referring to FIGS. 7A-C, smart socket 20 may include prongs 104 that extend outwardly from the smart socket 20 and include mechanisms 105 such as retractable barbs 105 that prevent removal of the module 1 from the smart socket 20 during charging. The prongs 104 with retractable barbs 105 are preferably placed in close proximity to plug receptacles 102 and 104. The module 1 includes female receptacles 107 that accommodate the prongs 104 when the barbs 105 are retracted, but do not allow the socket 20 to be removed when the barbs 105 are extended. The female receptacles 107 are placed in the same relative proximity to the plugs 108 and 109 as the prongs 104 are to the plug receptacles 102 and 104.

The retractable barbs 105 allow a locking connection between the smart socket 20 and the module 1 that is activated, for example, after the user has been authenticated during charging. The retractable barbs 105 may automatically retract once the charge is complete and the smart socket 20 deactivates the flow of electricity to the module 1. Alternatively, the user may manually stop the charging process and thus retract the retractable barbs 105. Preferably, the user must be authenticated using the aforementioned systems and methods in order to disengage the barbs 105 and thus release the module 1 from the smart socket 20. While this embodiment shows the prongs 104 with barbs 105 attached to the smart socket 20, in alternative embodiments, the locking mechanism may be part of the module 1 instead of or in addition to the locking mechanism described as part of the smart socket 20.

Figure 8A:
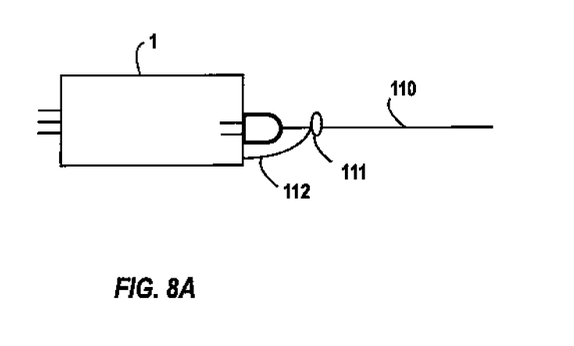
FIG. 8A is a top view of an embodiment of the module with a tether cable and securing bracket for preventing unauthorized disconnect of the vehicle plug from the module.
Figure 8B:
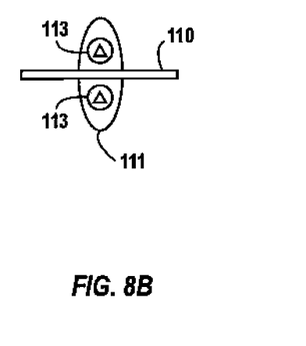
FIG. 8B shows an embodiment of the securing bracket with non-standard screw heads.

It is also preferable to include a mechanism to prevent unintentional or unauthorized disconnection of a vehicle plug from the module 1. For example, a vehicle plug may be stepped on or kicked during charging, preventing the vehicle from receiving an adequate charge. FIGS. 8A and 8B show an embodiment that includes a tether cable 112 and securing bracket 111 that prevents unintentional or unauthorized disconnection of the vehicle plug 110 from the module 1. In a preferred embodiment, the securing bracket 111 is secured to the vehicle plug 110 using screws or fasteners with non-standard heads to prevent unauthorized users from disconnecting the securing bracket 111 from the vehicle plug 110 and disconnecting the vehicle plug 110 from the module 1. The authorized user may be provided a tool that fits the non-standard screw heads to fasten or release the securing bracket 111 from the vehicle plug 110. In other embodiments, the securing bracket 111 may be fitted with a lock and only the authorized user is provided a key that opens the lock.

In light of the foregoing, it can be seen that a modularized interface, comprising a module and a smart socket for public use, for connecting a plug-in vehicle to the energy grid is provided that has the following advantages and benefits:

Identification of Energy User for Billing Purposes

A key issue for enabling public charging of electric vehicles is the ability to identify the energy user so that billing for electricity costs can be appropriately applied. As discussed, the inventive modularized interface contains a communication chip which will communicate with the local electric utility's Advanced Metering Infrastructure (AMI) Home Area Network (HAN). The module in this interface is programmed with the user's local electric utility account information or other billing information. This account information is transmitted via the communication interface to the HAN of the owner of the public electrical outlet and on to the local utility. The electricity which passes through the module is metered by the module. Upon disconnect, the metered data, including both time of use and consumption, is transmitted through the HAN connection to the local utility so that it can be billed to the energy user's local utility account. The utility meter through which the energy was drawn is then credited with an offsetting amount.

Security

Ensuring that publicly available electric vehicle outlets do not expose outlet owners to energy theft is another key issue. The inventive modularized interface secures energy usage through these means:

The module within the interface must be enabled at each use by the module owner (energy user). The module is equipped with user validation (password or other secure technique, such as biometric scan). The enabled module will communicate a unique access code to the HAN of the public electric vehicle outlet. The local utility will validate the code (tied to the module owner's utility account or other billing mechanism). Once validated, the utility will signal the public electric vehicle outlet to enable energy to flow to the module. Each smart socket will have remotely enabled on/off functionality built in. Once the flow of energy is broken (the module or vehicle is unplugged) the smart socket and the module are disabled. This automatic disabling will disable theft of electricity and deter theft of the modules since they will not be usable by anyone other than the module owner. An optional anti-theft feature is to enable the module to physically lock on to the plug from the vehicle so it can only be removed with a key or user validation (password or other secure technique, such as biometric scan).

The modules (user validation and utility account information) are initially programmed through a technique similar to USB-to-computer or module communication-to-HAN internet connection by the module owner in conjunction with the local utility. Re-programming the module must be done by the local utility and is only done after verification of the identity of the owner.

Public Electric Vehicle Outlets

Public electric vehicle outlets will be made available by local governments, and property and business owners. Availability of outlets may be driven by public policy or the desire to encourage electric vehicle owners to work for or do business with a particular business. For example, shopping malls may install outlets to make their stores a more attractive place at which to shop.

The smart sockets will be in range of the HAN, or if not, will be equipped with their own communication device which will act as a bridge between the module and the HAN. Alternatively, other communications interfaces may be used. As mentioned above, each smart socket will have remote connect/disconnect functionality through a unique identifier built in and controlled by the local utility.

Semi-Public Vehicle Outlets (Apartments/Condominiums)

Owners of electric vehicle who reside in multi-family units may not have private access to electrical outlets to charge their vehicles. Using the security features of the inventive modularized interface enables an outlet or bank of outlets to be installed in apartment/condominium parking areas with energy charges billed to the car owner.

Private Residence Outlets

While electric vehicle owners will not need to use the module to charge their cars at their own homes, they may be given incentive to do so by the local utility through special, reduced electric vehicle charging rates. Utilities will likely offer these rates during off-peak electricity demand periods. In this scenario, the module will communicate with the HAN, identifying the charging device as a vehicle which is eligible for electric vehicle rates. The module will confirm the device as a vehicle through the vehicle's built-in VIN chip or through the high amperage required for vehicle charging.

Vehicle Owner Control

The inventive modularized interface will allow electric vehicle owners to take advantage of off-peak electricity pricing. The module includes a timing device which is programmed through an Internet interface to allow vehicle charging at times set by the vehicle owner. Additionally, if price signals are available from the local utility through the HAN, the module can be programmed to respond to price signals at the vehicle owner's preference.

Utility Control

When vehicles are connected to the electricity grid through an inventive module, they are readily identified as electric vehicles by the local utility. If electric vehicles are charging during critical periods of peak demand the local utility or other controlling entity will be able to remotely discontinue charging by disabling the public electric vehicle outlet or, if charging at a private residence, opening the electric circuit within the module.

Providing Power to the Grid (Vehicle to Grid)

In some circumstances, it may be financially compelling for electric vehicle owners to sell stored electricity from their vehicle to the local electric utility. In this case, the inventive module can, through the HAN, instruct the utility to reverse the flow of power through any uniquely identified electric vehicle outlet. The amount of energy provided to the utility will be metered by the module and the car owner's utility account will be credited appropriately.

Although the invention has been described with reference to the presently preferred embodiments, it should be understood that various modifications could be made without departing from the scope of the invention.

What is claimed:

1. A modularized interface for connecting a plug-in electric vehicle to the energy grid comprising:
   a module integrated within or configured to be connected to a charging interface on the vehicle and connectable to a smart socket connected to the energy grid, the module comprising:
       a security authentication device for authenticating and authorizing an end user;
       a communication interface for forming a connection with a utility center;
       a processor within the module for controlling operation of the module;
       a switch that, when open, disables the module from delivering power to the vehicle, and, when closed, enables the module to deliver power to the vehicle;
       wherein the processor within the module controls the module so that the module is normally disabled, and is enabled only after the module is authenticated using the security authentication device, the utility center authorizes the module, and an end user's account, billing, credit, payment provision or combinations thereof using the connection is established via the communications interface with the utility center;
   the smart socket comprising:
       a processor within the smart socket for controlling operation of the smart socket;
       at least one switch that, when open, disables the smart socket from delivering power to the vehicle, and, when closed, enables the smart socket to deliver power to the vehicle through the module;
   wherein the processor within the smart socket controls the smart socket so that the smart socket is normally disabled, and is enabled only after the module, after being connected to the smart socket, identifies the smart socket and its associated meter, and user preferences, if any, regarding energy pricing or charging scheduling, preprogrammed into the module, are satisfied;
   wherein the processor within the module meters energy consumption or discharge while energy flows to or from the vehicle through the modularized interface; and
   wherein, when the module is disconnected from the smart socket, the processor within the smart socket disables the smart socket, and the processor within the module, after communicating the metered data to the utility center, disables the module.

2. The modularized interface of claim 1, wherein the processor in the module receives periodic price signals from the utility center over the communication interface and adjusts charging or discharging according to preferences defined by the user.

3. The modularized interface of claim 2, wherein the utility center disables or enables charging or discharging by the module by sending a signal over the communication interface.

4. The modularized interface of claim 1, further comprising a locking mechanism for preventing unauthorized disconnection between the module and the smart socket when the smart socket and module are enabled.

5. The modularized interface of claim 4, wherein the security authentication device triggers and disengages the locking mechanism between the module and the smart socket.

6. The modularized interface of claim 1, further comprising a securing bracket for preventing a vehicle plug from being disconnected from the module.

7. The modularized interface of claim 1, wherein the user preferences include a cost per kilowatt hour value.

8. The modularized interface of claim 1, wherein the user preferences include a time of day to charge the plug-in electric vehicle.

9. The modularized interface of claim 1, wherein the user preferences are not defined.

10. A modularized interface for connecting a plug-in electric vehicle to the energy grid comprising:
a module integrated within or configured to be connected to a charging interface on the vehicle and connectable to a socket connected to the energy grid, said module comprising:
a security authentication device for authenticating and authorizing an end user;
a communication interface for downlink or bi-directional communication with a utility center;
a processor within the module for controlling operation of the module;
a switch that, when open, disables the module from delivering power to the vehicle, and, when closed, enables the module to deliver power to the vehicle;
wherein the processor within the module controls the module so that the module is normally disabled, is enabled only after the module is connected to the socket, and the end user is authenticated and authorized using the security authentication device;
wherein the processor within the module meters energy consumption while energy flows to the vehicle through the modularized interface; and
wherein, when the module is disconnected from the socket, the processor within the module, after communicating the metered data to the utility center over the connection established via the communication interface, disables the module.

11. The modularized interface of claim 10, further comprising a locking mechanism for preventing unauthorized disconnection between the module and the smart socket when the smart socket and module are enabled.

12. The modularized interface of claim 11, wherein the security authentication device triggers and disengages the locking mechanism.

13. The modularized interface of claim 10, wherein the communication interface within the module is a wireless communication device.

14. The modularized interface of claim 10, wherein said module is plugged into a smart socket comprising a processor.

15. The modularized interface of claim 14, wherein the smart socket further comprises:
at least one switch that, when open, disables the smart socket from delivering power to the vehicle, and, when closed, enables the smart socket to deliver power to the vehicle through the module;
wherein the processor within the smart socket controls the smart socket so that the smart socket is normally disabled, and is enabled only after the module, after being connected to the smart socket, identifies the smart socket and its associated meter, and user preferences, if any, are satisfied.

16. The modularized interface of claim 15, wherein the user preferences are not defined by the user.

17. The modularized interface of claim 16, wherein the user preferences include at least one of a time of day to charge, a price per kilowatt hour, and a total not to exceed dollar amount.

18. The modularized interface of claim 15, wherein the processor within the module meters energy consumption or discharge while energy flows to or from the vehicle through the modularized interface; and
wherein, when the module is disconnected from the smart socket, the processor within the smart socket disables the smart socket, and the processor within the module, after communicating the metered data to the utility center, disables the module.

19. The modularized interface of claim 10, wherein a user is authenticated by typing in a password or satisfying a biometric scan.

20. A process for connecting a plug-in electric vehicle to the energy grid through an off-vehicle modularized interface, comprising a module and a smart socket that is connected to the energy grid, the module configured to be connected to a charging interface on the vehicle and to the smart socket, the process comprising the steps of:
authenticating and authorizing an end user's account using a security authentication device within the modularized interface;
forming a connection to a utility center through a communication interface;
enabling the module only after the module is connected to the smart socket, the end user is authenticated and authorized using the security authentication device, and the module and the end user's account using the connection established via the communication interface;
enabling the smart socket, and enabling energy to flow to the vehicle, only after the module, after being connected to the smart socket, identifies the smart socket and its associated meter, and any user preferences regarding energy pricing or charging scheduling, pre-programmed into the module, are satisfied;
metering energy consumption by the module while energy flows to the vehicle through the modularized interface;
when the module is disconnected from the smart socket, disabling the smart socket, communicating the metered data to the utility center over the connection established via the communication interface, and disabling the module.

21. The process of claim 20, further comprising locking the module to the smart socket when the smart socket and module are enabled.

22. The process of claim 21, further comprising disengaging the locking mechanism only after the end user is authenticated.

23. The process of claim 20, further comprising receiving periodic price signals from the utility center over the communication interface and adjusting charging or discharging according to preferences defined by the user.

24. A process for connecting a plug-in electric vehicle to the energy grid through an off-vehicle modularized interface, comprising a module and a socket that is connected to the energy grid, comprising the following steps:

authenticating and authorizing an end user using a security authentication device within the modularized interface;

enabling the module only after the module is connected to the socket and the end user is authenticated and authorized using the security authentication device;

enabling energy to flow to the vehicle through the modularized interface only after the end user is authenticated and authorized and any user preferences regarding energy pricing or charging scheduling, pre-programmed into the module, are satisfied;

metering energy consumption with the module while energy flows to the vehicle through the modularized interface;

forming a communication interface with a utility center; and when the module is disconnected from the socket, communicating the metered data to the utility center over the connection established via the communication interface, and disabling the module.

25. The process of claim 24, further comprising locking the module to the smart socket when the smart socket and module are enabled.

26. The process of claim 25, further comprising receiving authorization from the utility center via the communication interface.

27. The process of claim 24, further comprising receiving periodic price signals from the utility center over the communication interface and adjusting charging or discharging according to preferences defined by the user.

28. The process of claim 24, further comprising disabling or enabling charging or discharging by the module by sending a signal over the communications interface.

29. The process of claim 24, further comprising closing a switch in the socket to enable the socket before the enabling energy step.

* * * * *

UNITED STATES PATENT AND TRADEMARK OFFICE
CERTIFICATE OF CORRECTION

| | | |
|---|---|---|
| PATENT NO. | : 8,736,225 B2 | Page 1 of 1 |
| APPLICATION NO. | : 12/265678 | |
| DATED | : May 27, 2014 | |
| INVENTOR(S) | : Chris W. Chen et al. | |

It is certified that error appears in the above-identified patent and that said Letters Patent is hereby corrected as shown below:

In the Specification

In column 5, line 27, delete "10V" and insert -- 110V --, therefor.

In column 6, line 34, delete "34." and insert -- 34, --, therefor.

Signed and Sealed this
Twenty-first Day of October, 2014

Michelle K. Lee
*Deputy Director of the United States Patent and Trademark Office*